US012744873B2

(12) United States Patent
Xue et al.

(10) Patent No.: US 12,744,873 B2
(45) Date of Patent: Sep. 22, 2026

(54) TEMPORALLY STABLE OCCLUSION FREE CAPTION RENDERING POSITION IN Z-PLANE FOR STEREOSCOPIC VIDEO

(71) Applicant: Disney Enterprises, Inc., Burbank, CA (US)

(72) Inventors: Yuanyi Xue, Alameda, CA (US); Scott Labrozzi, Cary, NC (US); Eitan M. Abecassis, Morrisville, NC (US); Chetan Mathur, Apex, NC (US); Michael J. Bracco, Raleigh, NC (US)

(73) Assignee: Disney Enterprises, Inc., Burbank, CA (US)

( * ) Notice: Subject to any disclaimer, the term of this patent is extended or adjusted under 35 U.S.C. 154(b) by 105 days.

(21) Appl. No.: 18/765,216

(22) Filed: Jul. 6, 2024

(65) Prior Publication Data

US 2025/0247511 A1 Jul. 31, 2025

Related U.S. Application Data

(60) Provisional application No. 63/627,646, filed on Jan. 31, 2024.

(51) Int. Cl.
*H04N 13/128* (2018.01)
*G06T 7/73* (2017.01)
*H04N 13/00* (2018.01)

(52) U.S. Cl.
CPC ............. *H04N 13/128* (2018.05); *G06T 7/74* (2017.01); *G06T 2207/10021* (2013.01); *G06T 2207/20228* (2013.01); *H04N 2013/0081* (2013.01)

(58) Field of Classification Search
CPC .......... H04N 19/128; H04N 2013/0081; G06T 7/74; G06T 2207/10021; G06T 2207/20228

(Continued)

(56) References Cited

U.S. PATENT DOCUMENTS

2011/0273532 A1 11/2011 Kitazato et al.
2011/0292190 A1* 12/2011 Kim .................... H04N 13/327 348/54

(Continued)

FOREIGN PATENT DOCUMENTS

JP 2011239169 A 11/2011
JP 2012015774 A 1/2012

(Continued)

OTHER PUBLICATIONS

Fei-Fei Li, "Lecture 9 & 10: Stereo Vision", Stanford Vision Lab, 86 pgs., Oct. 14, 2021.

(Continued)

*Primary Examiner* — Joseph G Ustaris
*Assistant Examiner* — Jimmy S Lee
(74) *Attorney, Agent, or Firm* — Kwan & Olynick LLP

(57) ABSTRACT

In some embodiments, a method determines a disparity value from a plurality of disparity values in a current frame of a stereoscopic video. The disparity value is based on a difference of a value for a pixel between a first video and a second video of the stereoscopic video. A location is determined in a current frame that include the disparity value. The method analyzes first frames prior to the current frame to adjust disparity values in the first frames to generate one or more adjusted first disparity values. Also, the method analyzes second frames after the current frame to adjust disparity values in the second frames to generate one or more adjusted second disparity values. The one or more adjusted first disparity values and the one or more adjusted second disparity values are output for use in displaying captions in the first video or the second video.

20 Claims, 8 Drawing Sheets

(58) Field of Classification Search
USPC .............................................................. 348/42
See application file for complete search history.

(56) References Cited

U.S. PATENT DOCUMENTS

| | | | | |
|---|---|---|---|---|
| 2012/0038745 | A1* | 2/2012 | Yu | H04N 13/183 348/46 |
| 2012/0249746 | A1 | 10/2012 | Cornog et al. | |
| 2012/0256951 | A1 | 10/2012 | Tsukagoshi | |
| 2012/0262542 | A1* | 10/2012 | Veera | G06T 5/77 348/E13.001 |
| 2013/0162641 | A1* | 6/2013 | Zhang | H04N 13/128 345/419 |
| 2013/0201283 | A1* | 8/2013 | Broberg | H04N 7/0882 348/43 |
| 2014/0253683 | A1 | 9/2014 | Eyer et al. | |
| 2015/0130913 | A1 | 5/2015 | Shimizu et al. | |
| 2016/0189380 | A1* | 6/2016 | Li | H04N 13/183 348/50 |
| 2019/0295280 | A1* | 9/2019 | DiVerdi | G06F 3/011 |
| 2024/0378751 | A1* | 11/2024 | Yamazaki | G06T 7/80 |

FOREIGN PATENT DOCUMENTS

| | | | |
|---|---|---|---|
| JP | 2012120143 | A | 6/2012 |
| JP | 2012518314 | A | 8/2012 |
| JP | 2013239834 | A | 11/2013 |
| WO | 2012075603 | A1 | 6/2012 |

OTHER PUBLICATIONS

Japanese Patent Application No. 2024-135171, Office Action, mailed Sep. 3, 2025, 2 pages.
Japanese Patent Application No. 2024-135171, Office Action, mailed May 13, 2025, 5 pages.
Extended European Search Report, EP Application No. 24195784.4, mailed Dec. 23, 2024, 12 pages.
Communication pursuant to Article 94(3) EPC, EP Application No. 24195784.4, Apr. 7, 2026, 10 pages.

* cited by examiner

TEMPORALLY STABLE OCCLUSION FREE CAPTION RENDERING POSITION IN Z-PLANE FOR STEREOSCOPIC VIDEO

CROSS REFERENCE TO RELATED APPLICATIONS

Pursuant to 35 U.S.C. § 119(e), this application is entitled to and claims the benefit of the filing date of U.S. Provisional App. No. 63/627,646 filed Jan. 31, 2024, entitled "Automatic Method to Produce Temporally Stable Occlusion Free Subtitle Rendering Position in Z-plane for Stereoscopic Video", the content of which is incorporated herein by reference in its entirety for all purposes.

BACKGROUND

Stereoscopic video is a type of media presentation that utilizes a pair of videos to reconstruct the disparity that is the foundation of three dimensional (3D) visual perception of human eyes. Disparity or Z-plane position is defined as the horizontal displacement between a left video and a right video. In a convergent camera setup, a more negative value of disparity for an object implies an object is closer to the viewer. In a parallel camera setup, the disparity value will always be positive, and a larger disparity value in parallel camera setup indicates closer to the viewer.

Captions may be rendered in the stereoscopic video. The placement of captions in the Z-plane may cause problems for a viewer. If the captions are placed too far from the viewer in the Z-plane, the captions may be occluded by objects in front of the captions. Also, if the captions are placed too close to the viewer in the Z-plane, eye fatigue may result where the viewer has to focus on objects that are farther away in the Z-plane and the captions that are too close. Another problem is where the Z-plane position of captions changes drastically over successive frames (e.g., near then far), which causes eye fatigue where the viewer is hunting for the captions in different Z-plane positions.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
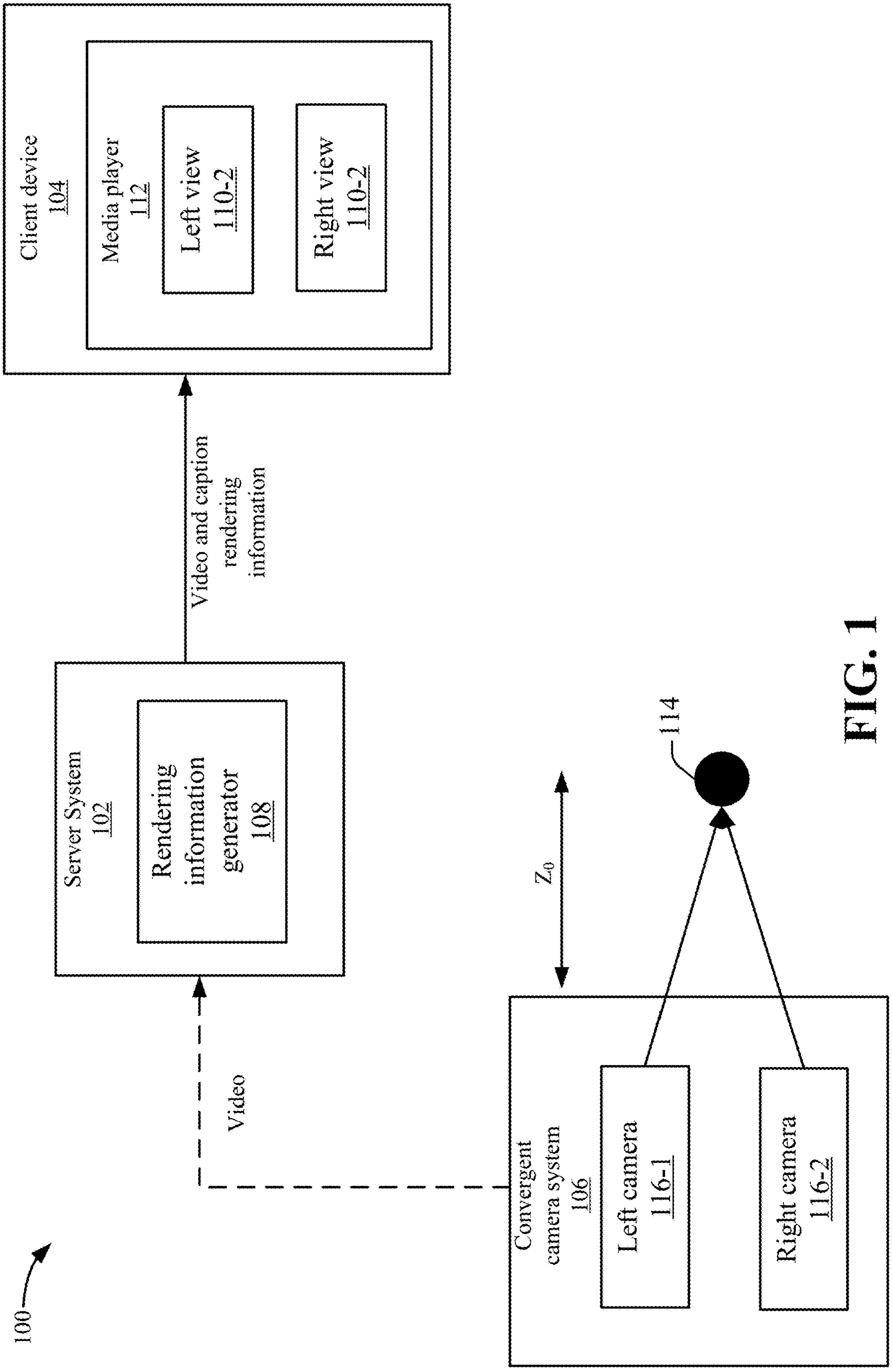
FIG. 1 depicts a system for processing stereoscopic video according to some embodiments.

Described herein are techniques for a video display system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

In some embodiments, a system determines disparity values for text that is used to display captions in a stereoscopic video. The text may be different types of text. In some embodiments, the text may be referred to as captions, which may be subtitles or closed captions for the stereoscopic video. The term "caption" may indicate the functionality of the text. In some embodiments, the term caption may be either closed captions or subtitles. A closed caption provides the textual transcript of a video's dialogue. It is designed for use by hard of hearing audiences. Subtitles provide a textual translation of the video dialogue. The subtitles may assume the viewer can hear the audio but cannot understand the language. Both of closed captions and subtitles are timed text which reflects the content of the video's dialogue. In some embodiments, the stereoscopic video may have a first video and a second video, referred to as a left video and a right video. Captions may be displayed in both the left video and the right video. In the discussion below, the processes may be applied to the left video or the right video.

To process where to display the captions in the stereoscopic video, the system uses a map that describes a motion of objects in frames of the stereoscopic video, and the difference in position or depth of corresponding objects in a pair of frames from a left video and a right video in the stereoscopic video. The map may be a high quality per-frame optical flow/disparity map. The map may include disparity values for one or more pixels of the pair of frames. The left video and the right video may include the same frame numbers. The left video and the right video may be of the same size, or may be of different sizes. For example, the resolution of the left and the right view of the stereo video do not need to be the same for this process to be performed. The disparity map may reference disparity values for the frame numbers. When a stereoscopic video is referred to in the processes herein, the processing may determine disparity values from the relationship of the left video and the right video.

The system then applies a window, such as a fixed bidirectional window, to adjust, such as filter/smooth out, noisy disparity values over multiple frames. The bidirectional window may consider disparity values in a forward direction and a backward direction for a selected frame. After the disparity values are smoothed, the system starts from a first value set to x, such as a lowest (most negative) disparity value from a global set of disparity values in the stereoscopic video that is the closest to the viewer. Then, the system finds frames that contain cell values at x. The system loops through each frame and each cell location that includes a disparity value equal to x. A cell location may be associated with a disparity value. In the loop, the system adjusts the disparity values both a backward direction and a forward direction to meet a requirement, such as a just noticeable difference (JND) requirement. The just noticeable difference requirement may define a smallest change rate on the z-plane for caption to be perceptible. After that processing, the system gradually adjusts the disparity value to be farther away from the viewer (e.g., increases), and each time the system iteratively adjusts the disparity values both the backward direction and the forward direction to meet the requirement. After finishing the processing, such as when the lowest processed disparity value meets a threshold, the system outputs the disparity values for the frames. The system then uses the adjusted disparity values to display captions with the stereoscopic video.

System

FIG. 1 depicts a system 100 for processing stereoscopic video according to some embodiments. Stereoscopic video is a type of media presentation that utilizes a pair of videos to reconstruct the disparity that is the foundation of three dimensional (3D) visual perception of human eyes. Stereoscopic video may be video that simulates depth perception using two videos captured using two cameras for a left and a right eye of a viewer. The images create the illusion of three-dimensional depth when viewed via a client device 104.

A convergent camera system 106 includes multiple cameras, such as a left camera 116-1 and right camera 116-2, that capture respective videos (e.g., a left video and a right video). Convergent camera system 106 may be used in any stereo camera geometry, such as a convergent stereo camera setup, a parallel stereo camera setup, any convergent camera setup that can be calibrated to a parallel stereo camera, etc. Video of an object 114 may be captured (the video may include multiple objects). Disparity or Z-plane position is defined as the horizontal displacement between the left and the right video of the images captured of object 114. In a convergent camera setup, a more negative value of disparity implies an object is closer to the viewer.

Server system 102 receives the stereoscopic video. Although pictured as receiving the video from convergent camera system 106, server system 102 can receive the stereoscopic video from any source. Captions may be displayed with the stereoscopic video. As mentioned above, captions may include subtitles, closed captions, or other text that is displayed with the stereoscopic video.

Server system 102 includes a rendering information generator 108 that analyzes the stereoscopic video and generates caption rendering information for captions. The caption rendering information may include information that is used to display captions with the stereoscopic video, such as coordinates of the Z-plane position of captions. The coordinates of the Z-plane position may be determined based on the adjusted disparity values as will be described below.

Client device 104 receives the stereoscopic video and caption rendering information. Client device 104 may include different devices, such as virtual reality headsets, 3D televisions, smartphones, tablets, 3D glasses, etc. Client device 104 includes a media player 112 that plays the stereoscopic video in a 3D space. A left view 110-2 and a right view 110-2 may view two videos (e.g., from the left camera 116-1 and the right camera 116-2, respectively). Captions may be displayed based on respective disparity values in the left video in left view 110-2 and a right video in right view 110-2.

In order to render captions in the stereoscopic video, it may be the case that for each caption phrase, the caption rendering information includes disparity values are specified to instruct media player 112 at client device 104 to render the caption in an appropriate place in the Z-plane. Client device 104 may have different processes that use disparity values to display captions in the video. The appropriate place is defined as a range, such as a narrow feasible range, of disparity values such that the caption will not be placed to be too far from the viewer's viewpoint in a 3D space, which can cause the appearance of caption buried under the video; and also not be placed too close to the viewpoint, which can cause occlusion and fatigue to the viewer.

It is common that caption phrases last more than a fraction of a second. For the duration of the caption being displayed in the stereoscopic video, it may be equally important to make sure the caption appears to be held at a constant location in the 3D space. If the caption is making small jittery movements through that time, it is likely to introduce discomfort and a subpar viewing experience to the user. And if the caption is making a big movement through that time, it will likely distract the viewer and lead to discomfort due to the eye movement to hunt for (e.g., look for) the moved captions in the 3D space.

Also, while the caption is rendered, the underlying scene of the stereoscopic video may change, which is most likely changing the premises of the first problem to solve of where to place the captions. Rendering information generator 108 uses a process that can solve both problems of caption placement and limiting movement of the captions in the 3D space.

In some embodiments, rendering information generator 108 uses a map, such as a high quality per-frame optical flow/disparity map. An optimal flow/disparity map may describe the motion of objects in the frames and the difference in position or depth of objects in the pair of frames in the videos. There may be a disparity map per frame, and the particular disparity map may or may not be of the full set of pixels of the frame. In a full-pixel case, there are an identical number of disparity values per frame as with the resolution of a video frame. In a non-full-pixel case, there may be N*M disparity values. The disparity map can be size of N*M, and N can be >=1 and <=video height, and M can be >=1 and <=video width. When the processing of disparity values is discussed for a disparity map, it may be for either the first disparity map or the second disparity map.

The map may be generated in different ways, such as by a prediction network (e.g., neural network) that is based on an estimation method to generate per-frame disparity maps for the stereoscopic video, but may be generated using other processes. The process to determine the rendering information may be agnostic of the particular choice of disparity map estimation method, as long as the estimation methods are per-frame and of a high quality, such as above a threshold. Rendering information generator 108 may then apply a window, such as a fixed bidirectional window, to filter/smooth out noisy measurement of the disparity values. The bidirectional window may consider disparity values in a forward direction and a backward direction for a frame. After that, a loop is employed, and in the loop, rendering information generator 108 starts from a first value, such as a lowest (most negative) disparity value, and gradually increases the value, and each time subtitle processing system 108 iteratively adjusts the disparity values both backward and forward to meet a requirement, such as a just noticeable difference requirement, for the disparity value change rate. The just noticeable difference requirement may define a threshold, such as a smallest change rate that may be perceptible, or another value that is desired (e.g., a configured change rate). Finally, rendering information generator 108 clamps the processed disparity value to the feasible range as specified.

The process provides many advantages. For example, the captions displayed using the adjusted disparity values may not be occluded by objects in the stereoscopic video. Also, the problems of captions being too close in the Z-plane or shifting over multiple frames may be avoided.

The following describes the process to generate adjusted disparity values for captions in more detail.

Overall Process

Figure 2:
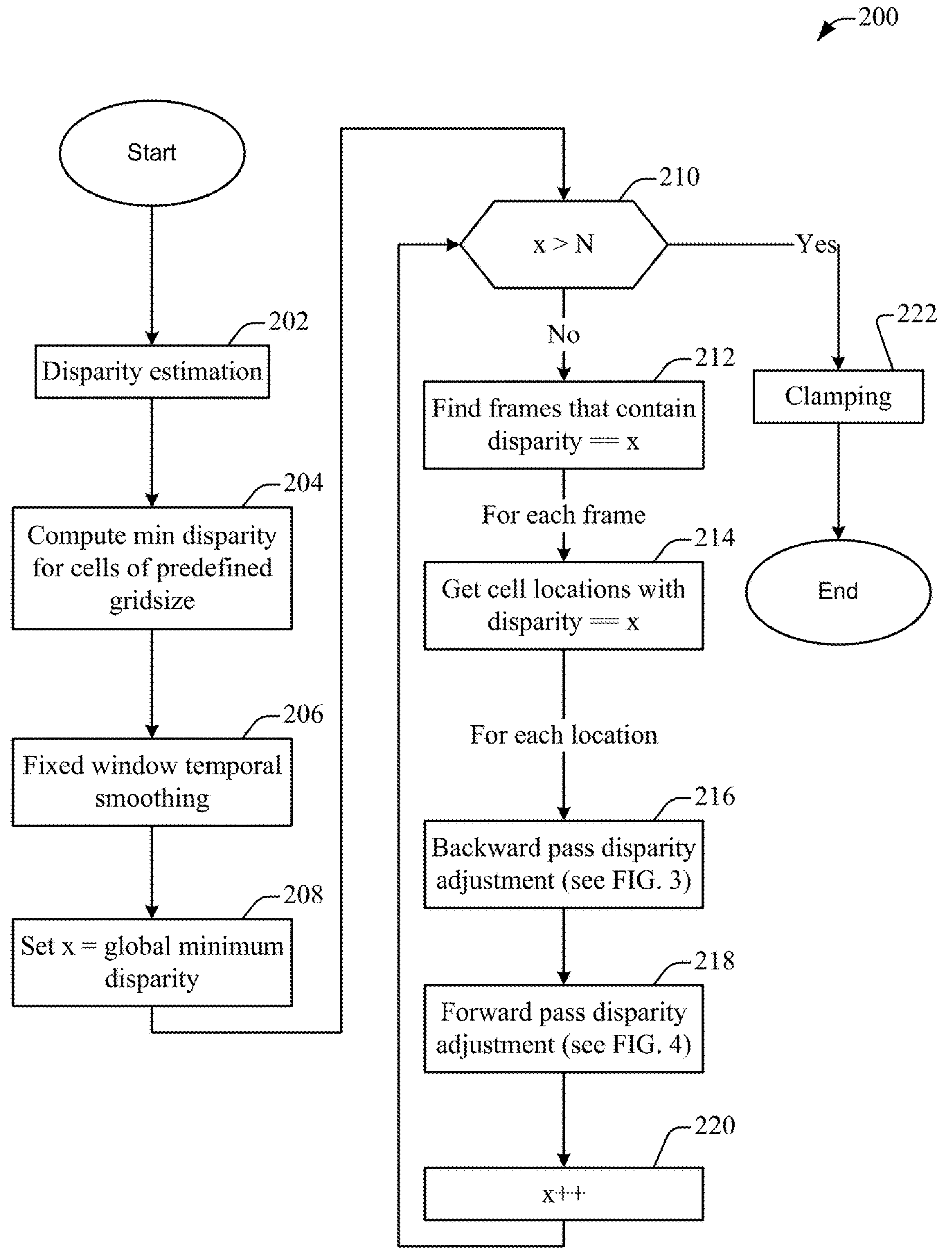
FIG. 2 depicts a simplified flowchart for processing disparity values for captions according to some embodiments.

FIG. 2 depicts a simplified flowchart 200 for processing disparity values for captions according to some embodiments. The following process may be performed for the right video or the left video. The following process may be based on a setup where a more negative value of disparity for an object implies an object is closer to the viewer. In another setup, the disparity value will always be positive, and a larger disparity value indicates closer to the viewer, and this setup may have a different flow. For example, the minimum disparity may be changed to the maximum disparity, and the value of x may be decremented. At 202, rendering information generator 108 determines a disparity estimation. The disparity estimation may compute differences in positions between two corresponding images from two videos, such as the left image and the right image from the left video and the right video of the stereoscopic video. The disparity estimation may generate per-frame disparity maps, such as a disparity map for corresponding frames 1, corresponding frames 2, corresponding frames 3, etc. of the left video and the right video. As discussed above, the disparity estimation may use different processes to generate disparity maps.

At 204, rendering information generator 108 computes a minimum disparity for cells of a predefined grid. Although the minimum disparity value is discussed, the disparity value that is determined may be the disparity value that is closest to the viewer (in some cases the most positive). In some implementations, this may be the largest disparity value. Values other than the minimum for cells may be used, such as the average disparity value for the cell. The cell may be a predefined area of a frame, which may be a portion of the frame, or could be the entire frame. There may be one or more cells in a frame. The minimum (most negative) disparity value may be determined from disparity values from the cells of the disparity maps.

At 206, rendering information generator 108 performs a smoothing operation, such as a fixed window temporal smoothing operation. The temporal smoothing operation may use a fixed window that may reduce variations in the disparity estimation over multiple frames. This may remove or adjust disparity values that may be outliers. The smoothing operation may or may not be performed.

Rendering information generator 108 may then process disparity values to adjust some disparity values to improve the display of captions in the stereoscopic video. The adjustment may adjust disparity values in frames to a just noticeable distance in a backwards and a forward direction. In some embodiments of the process, at 208, rendering information generator 108 sets a value x, where x=global minimum disparity for all the frames in the video. For example, the disparity values for all cells are analyzed, and the minimum disparity value from disparity values of the cells is set as the value of x.

At 210, rendering information generator 108 determines if the value x is greater than N, where N may be a threshold (e.g., a positive or negative number). In some embodiments, the value of N may be predefined, such as set at "0", but other values may be used. This check is used to determine when to stop adjusting disparity values. As will be described below, the process starts with a minimum disparity value and gradually increases the disparity value that is found from the global disparity values. The process may be stopped when a maximum disparity value is reached. For example, the system may not adjust disparity values when they are greater than a value, such as a value of zero. Stopping the process when disparity values do not have to be checked further may improve the speed of the adjustments.

If the value of x is not greater than N, at 212, rendering information generator 108 finds frames with a disparity value that is equal to x (disparity==x). There may be frames that have one or more disparity values that equal x (e.g., some frames may include a cell with the minimum disparity value and some frames may have multiple cells with the minimum disparity value). For each frame that is found, the following may performed as described. At 214, rendering information generator 108 determines cell locations in each frame with disparity values that equal x (disparity==x). For examples, a minimum disparity value may be −8000.

For each cell location that is determined, the following may be performed as described in 216 and 218. At 216, rendering information generator 108 performs a backward pass disparity adjustment for each of the locations that includes a disparity value that equals x. This process is described in FIG. 3. Then, at 218, rendering information generator 108 performs a forward pass disparity adjustment for each of the locations that includes a disparity value that equals x in the frames. This process is described more in FIG. 4. The above processes may analyze locations in prior frames (backward pass) and subsequent frames (forward pass) to adjust disparity values of the locations, if needed.

After performing the backward pass disparity adjustment and the forward pass disparity adjustment for each location, the following is performed. Each location may be associated with a disparity value that may be adjusted. At 220, rendering information generator 108 increments the disparity value to the next lowest minimum disparity value (x++) to determine the next disparity value that is farther away from the viewer. The value of x may be decremented if more negative disparity values are farther away from the viewer. For example, if the minimum disparity value is −8000, the next highest minimum disparity value is greater than −8000, such as −7999. This step may move to a disparity value that is farther away from the viewer, which could be a less positive number if the setup has disparity values that are greater are closer to the viewer. The process then reiterates to 210 where the process is performed with a new value of x.

If the value x is greater than N, at 222, rendering information generator 108 may perform a clamping operation to clamp the disparity value (e.g., whether adjusted or not adjusted) to a feasible range. The clamping may adjust disparity values that are outside the feasible range to be a value that meets the feasible range. If a feasible range is not used, or clamping is not desired, the clamping may not be performed. The process then ends, and the adjusted disparity maps may be output. The adjusted disparity maps may then be used to generate rendering information for captions. For example, the rendering information may be at the adjusted disparity values, or a set distance from the adjusted disparity values. Then, the rendering information for the cells is sent to client 104 for use in displaying captions for the frames. Client 104 may use the rendering information to display the captions in the Z-plane with the stereoscopic video.

The following describes the backwards pass and forward pass disparity adjustments. The adjustments may establish a rate of Z change for which movement (in/out in the Z plane) of a caption may not be noticeable. A just noticeable difference value may be determined in which viewers may not be able to notice a difference in a Z change for a caption. This allows rendering information generator 108 to adjust disparity values at a rate that may not be detectable to viewers. This may improve the temporal stability of the captions. The just noticeable difference value may be set at different desired values, and may be above a point that can be noticed if desired. Also, the adjustments may meet a minimum disparity value to avoid occluded captions. The disparity values are adjusted iteratively in both the forward direction and backward direction to meet the minimum disparity value while changing disparity values at a non-detectable rate.

Backwards Pass Disparity Adjustment

Figure 3:
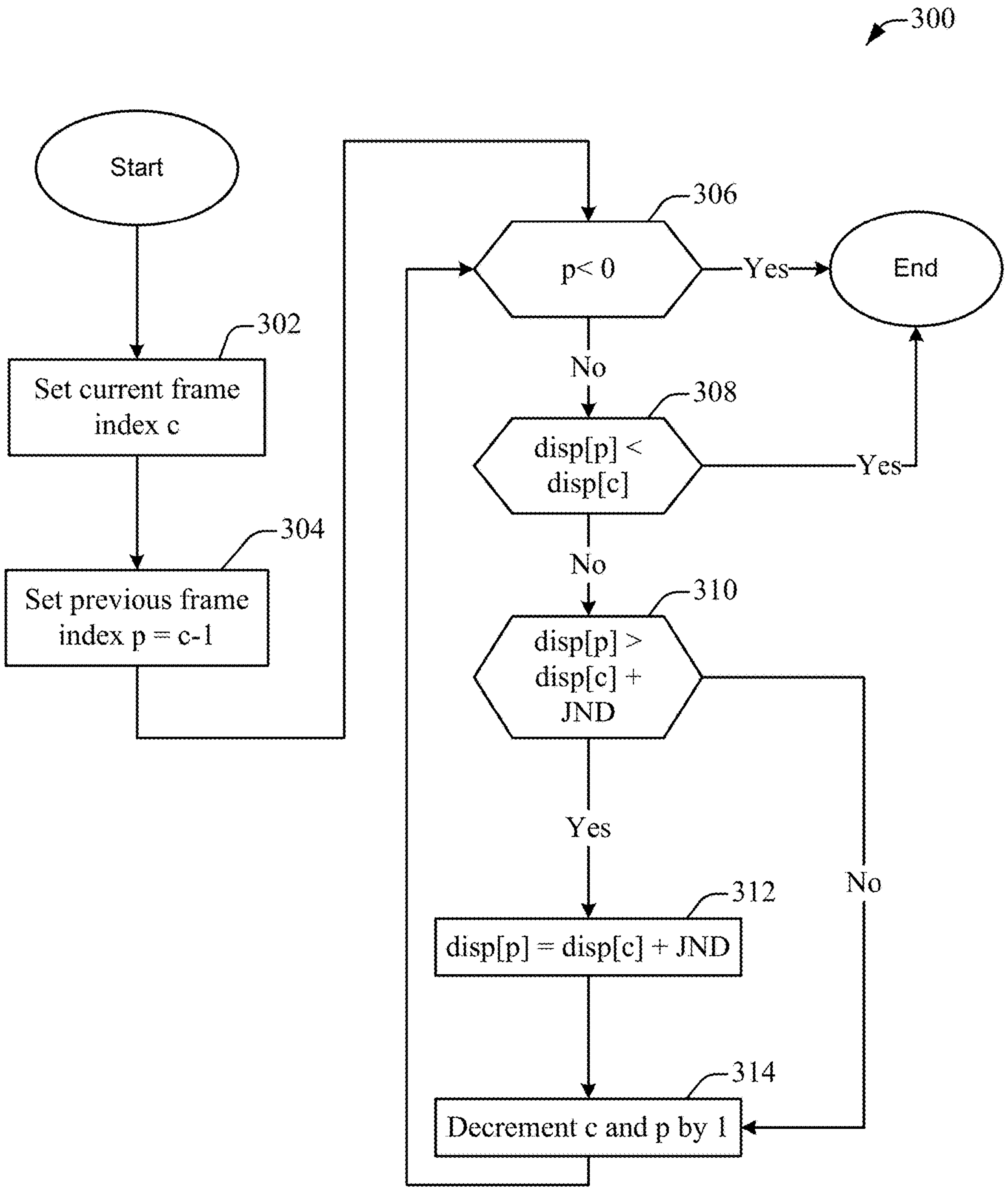
FIG. 3 depicts a simplified flowchart of the backwards pass disparity adjustment according to some embodiments.

FIG. 3 depicts a simplified flowchart 300 of the backwards pass disparity adjustment according to some embodiments. The following process may be based on a setup where a more negative value of disparity for an object implies an object is closer to the viewer. In another setup, the disparity value will always be positive, and a larger disparity value indicates closer to the viewer, and this setup may have a different flow. For example, the just noticeable difference may be negative, and the comparison in 308 may be "greater than" instead of "less than". The following may be performed for each location that is determined at 214 in FIG. 2. At 302, rendering information generator 108 sets a current frame index to c. The index may be a frame that is selected based on its disparity value at 212 in FIG. 2. At 304, rendering information generator 108 sets a previous frame index to a value of p, wherein p=c−1. This may refer to a position that would be the previous frame to the current frame, if applicable (e.g., the previous frame index cannot be before the video starts). Then, a loop is performed until the value of p is less than zero (e.g., the value of p cannot go before the first frame of the video).

At 306, rendering information generator 108 determines if the value of p is less than zero. This may test whether the first frame of the video has been reached and has been analyzed already. If so, the process then ends. If not, at 308, rendering information generator 108 determines if disp[p] is less than disp[c] to determine if disp[p] is closer to the viewer. It is noted that a more negative number may be less than a less negative number (e.g., −8000<−7800). Similarity, a less positive number is a lesser value (+1000<+2000). This may determine if the disparity value of the previous index p (e.g., the pixel in the previous frame at the same position as the current pixel in the current frame being analyzed) is less than the disparity value of the current index c (e.g., the pixel in the current frame at the same position). If so, the process may end. One reason the process may end is because the disparity value of the previous frame may be less than the disparity value of the current frame, and does not need to be adjusted (e.g., the disparity value may have been adjusted already in a previous iteration since the process starts from the minimum disparity values). If not, at 310, rendering information generator 108 determines if the disparity value at the previous index is greater than the disparity value of the current index plus a just noticeable difference value. For example, a disparity value for a previous frame (e.g., −7800) that is greater than the disparity value for the current frame (e.g., −8000)+a just noticeable distance value (+100) may be (e.g., −7800>−8000+100=−7800>−7900). Also, a disparity value for a previous frame (e.g., −8100) that is less than the disparity value for the current frame (e.g., −8000)+a just noticeable distance value (+100) may be (e.g., −8100<−8000+100=−8100<−7900). If this is true, at 312, rendering information generator 108 adjusts disparity value at the previous index p, such as sets the disparity value at the previous index p to be equal to the disparity value of the current index plus the just noticeable difference value (e.g., −8000+100=−7900). Also, the adjusted disparity value may be set to the disparity value of the current index plus a value equal to or less than the just noticeable difference value. The adjustment of the disparity value may ensure that the change in disparity values between the previous frame and the current frame is not more than the just noticeable difference value for this pixel. That is, the viewer may not notice the change in position of the caption that changes from −8000 to −7900 instead of from −8000 to −7800. If not, the process proceeds directly to 314

At 314, rendering information generator 108 decrements the value of c and p by 1. For example, if the frame numbers were c=1000 and p=999, the new value of c is 999 and the new value of p is 998. The process then reiterates to 306 where it is determined whether p is less than zero. If p is less than 0, the process then ends. The value of zero means that this is the start of the video, and any value that represents the start of the video can be used. The above process iteratively adjusts the disparity values for locations in the backwards direction to meet the just noticeable difference requirement for disparity value change rate until the disparity value of the location of the current frame is greater than the disparity value of the location of the previous frame. The adjustment process may stop when the disparity value for the location of the next frame is smaller than the current disparity value of the location of the current frame, which may indicate the disparity value for the location of the next frame has been adjusted already or the beginning of the video has been reached. This process is called for each location that is determined at 214 in FIG. 2.

Forward Pass Disparity Adjustment

Figure 4:
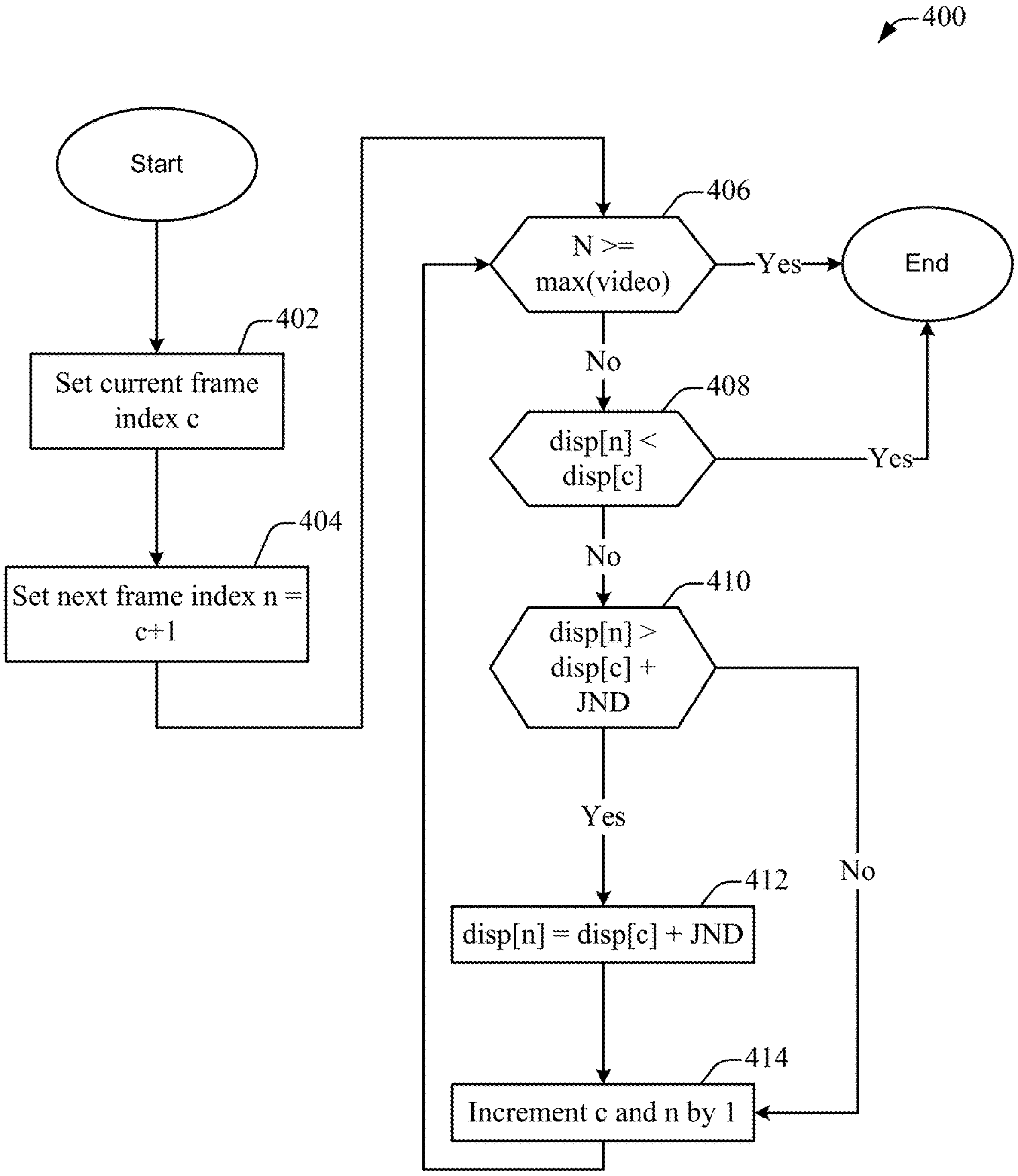
FIG. 4 depicts a simplified flowchart for a forward pass disparity adjustment according to some embodiments.

FIG. 4 depicts a simplified flowchart 400 for a forward pass disparity adjustment according to some embodiments. The following process may be based on a setup where a more negative value of disparity for an object implies an object is closer to the viewer. In another setup, the disparity value will always be positive, and a larger disparity value indicates closer to the viewer, and this setup may have a different flow. For example, the just noticeable difference may be negative, and the comparison in 408 may be "greater than" instead of "less than". The following may be performed for each location that is determined at 214 in FIG. 2. Each location may be associated with a disparity value that may be adjusted. At 402, rendering information generator 108 sets the current index to c. The index may be a frame that is selected based on its disparity value in FIG. 2. At 404, rendering information generator 108 sets a next index to a value of n, wherein n=c+1. This may refer to a position that would be the next frame, if applicable. Then, a loop is performed until n is greater than or equal to a value, which may be the last frame of the video.

The following may then perform a loop. At 406, rendering information generator 108 determines if the value of the next index n is greater than or equal to the maximum number of frames of the stereoscopic video. If so, the end of the stereoscopic video may be reached and the process ends. If not, at 408, rendering information generator 108 determines if the disparity of the next index is less than the disparity of the current index, disp[n]<disp[c] to determine if disp[n] is closer to the viewer. This may determine if the disparity value of the next index n (e.g., the pixel in the next frame at the same position as the current pixel in the current frame being analyzed) is less than the disparity value of the current index c (e.g., the pixel in the current frame at the same position). If so, the process may end. One reason the process may end is because the disparity value of the next frame may be less than the disparity value of the current frame and does not need to be adjusted (e.g., the disparity value may have been adjusted already in a previous iteration since the process starts from the minimum disparity values). If not, at 410, rendering information generator 108 determines if the disparity value of n is greater than the disparity value of current index plus a just noticeable difference value. If this is true, at 412, rendering information generator 108 adjusts the disparity value at the next index n, such as sets the disparity value at the next index n to be equal to the disparity value of the current index plus the just noticeable difference value. For example, a disparity value for a next frame (e.g., −7800) that is greater than the disparity value for the current frame (e.g., −8000)+a just noticeable distance value (+100) may be (e.g., −7800>−8000+100=−7800>−7900). Also, a disparity value for a next frame (e.g., −81000) that is less than the disparity value for the current frame (e.g., −8000)+a just noticeable distance value (+100) may be (e.g., −8100<−8000+100=−8100<−7800). The adjustment of the disparity value may ensure that the change in disparity values between the next frame and the current frame is not more than the just noticeable difference value for this pixel. Also, the adjusted disparity value may be set to the disparity value of the current index plus a value equal to or less than the just noticeable difference value. That is, the viewer may not notice the change in position of the caption. If not, the process proceeds directly to step 414.

At 414, rendering information generator 108 increments the value of the current index c and the value of the next index n by 1. For example, if the frame numbers were c=1000 and n=1001, the new value of c is 1001 and the new value of p is 1002. The process then reiterates to 406. When the value of the next index is greater than or equal to the end of the stereoscopic video, the process may end. The above process iteratively adjusts the disparity values in the forward direction to meet the just noticeable difference requirement for disparity value change rate until the disparity value of the location in a current frame is greater than the disparity value of a location in the previous frame or the end of the video is reached. The adjustment process may stop when the disparity value for next frame is smaller than the current disparity value, which may indicate the disparity value for the next frame has been adjusted already. This process is called for each location that is determined at 214 in FIG. 2.

EXAMPLES

Figure 5:
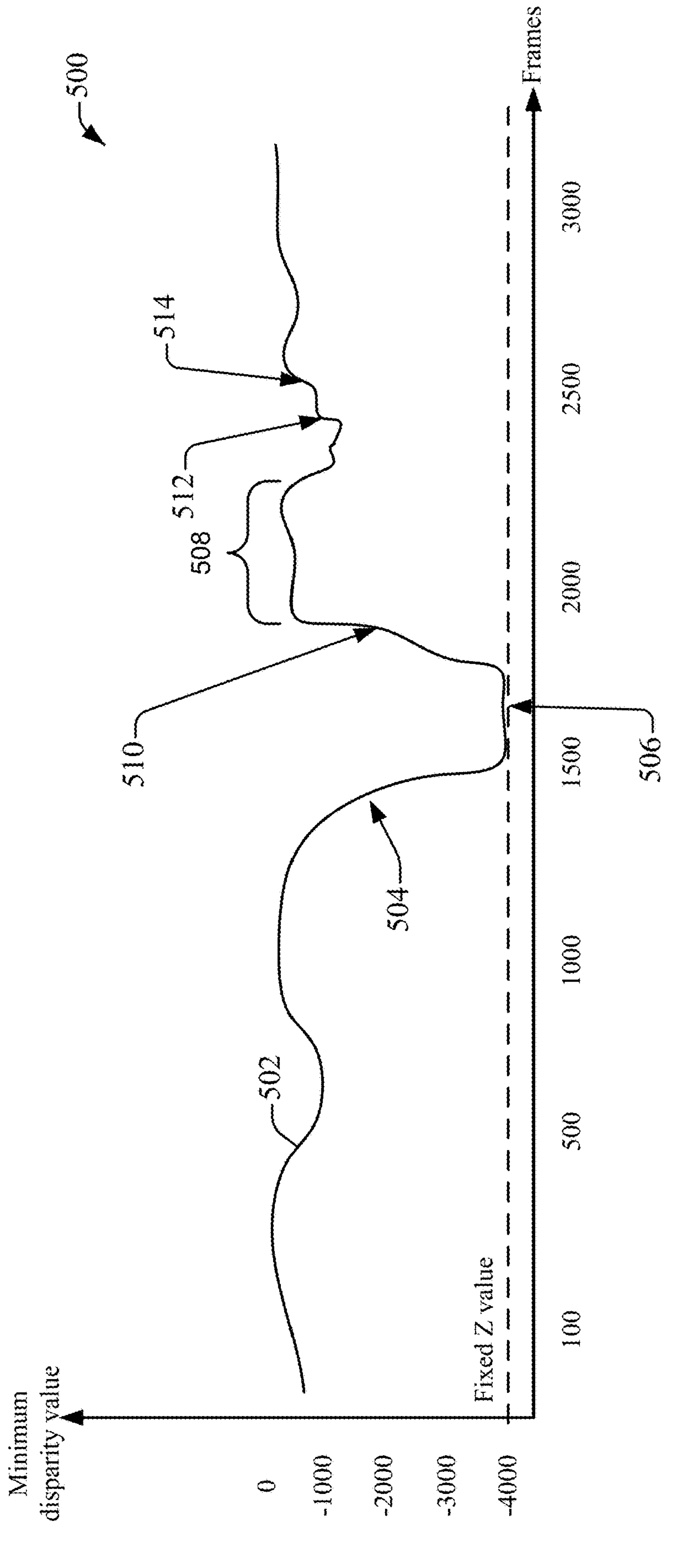
FIG. 5 depicts a graph of raw disparity values for a stereoscopic video according to some embodiments.

FIG. 5 depicts a graph 500 of raw disparity values for a stereoscopic video according to some embodiments. The Y-axis depicts the minimum value for disparity values for frames of the stereoscopic video, and the X-axis depicts the frame number in the stereoscopic video. At 502, an original smooth raw disparity curve is shown that represents the minimum disparity values for frames in the video. The disparity values may be unadjusted values.

The following may describe issues that may occur when these disparity values are used to display captions. At 504, an issue occurs where the rate of Z change may be too fast. Any caption displayed over this time may visibly move in the video and not be temporally stable.

At 506, a fixed Z approach for the captions solves a majority of the occlusion problems and solves temporal stability. Here, the fixed Z value may allow a caption to not be occluded by objects. However, at 508, a fixed Z approach may cause hunting and fatigue when the difference between the small (negative) fixed Z value is far away from the disparity values for objects in the video. Here, the objects may be much farther away from the captions if the captions are displayed at the fixed Z value.

At 510, similar to 504, but in the other direction, another issue occurs where the rate of Z change is too fast. Any caption displayed over this time may visibly move in the video and not be temporally stable. At 512 and 514, another issue where the rate of Z change may be too fast and any caption displayed over this time may appear to flicker even though the disparity values may not be moving significantly.

Figure 6:
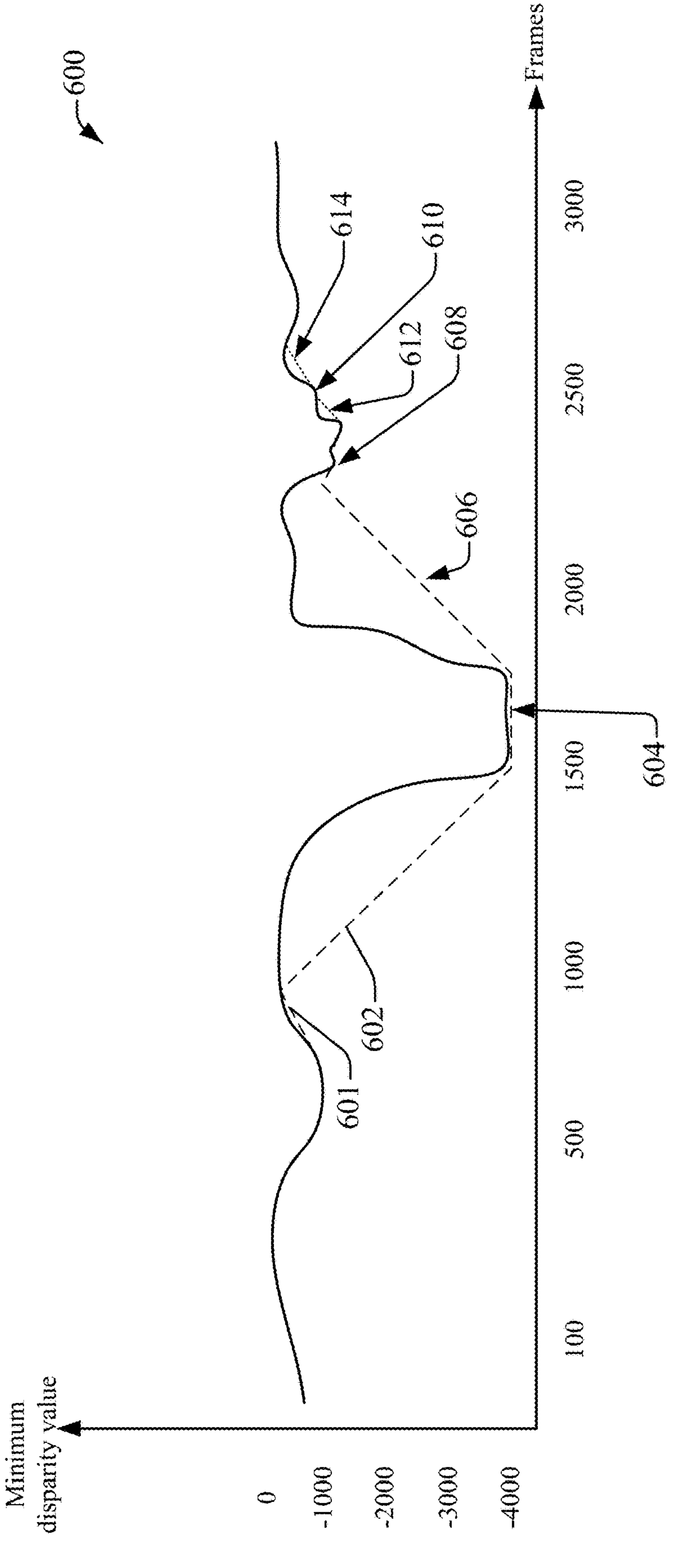
FIG. 6 shows a graph with the adjustments using a rendering information generator according to some embodiments.

FIG. 6 shows a graph 600 with the adjustments using rendering information generator 108 according to some embodiments. At 601, a processed output disparity curve is shown with dotted lines. At 602, rendering information generator 108 adjusts a rate of change of the disparity values to meet the just-noticeable difference range. This change avoids the issue where the rate of Z change is too fast and the caption displayed over this time may not visibly move in the video from a viewer's viewpoint. The rate of change in which a caption is displayed over the frames may help with temporal stability of the captions by not moving more than a just noticeable difference in sequential frames.

At 604, a fixed Z value protects captions from being occluded. The fixed Z value may be closer than any objects in the video. At 606, rendering information generator 108 adjusts the disparity values as fast as possible while honoring the just-noticeable difference to get as close to the measured disparity for the video.

At 608 and 610, rendering information generator 108 protects captions from being occluded by adjusting the minimum value of the captions. At 612 and 614, rendering information generator 108 adjusts the rate of change to a just-notable difference range to avoid flicker.

Figure 7:
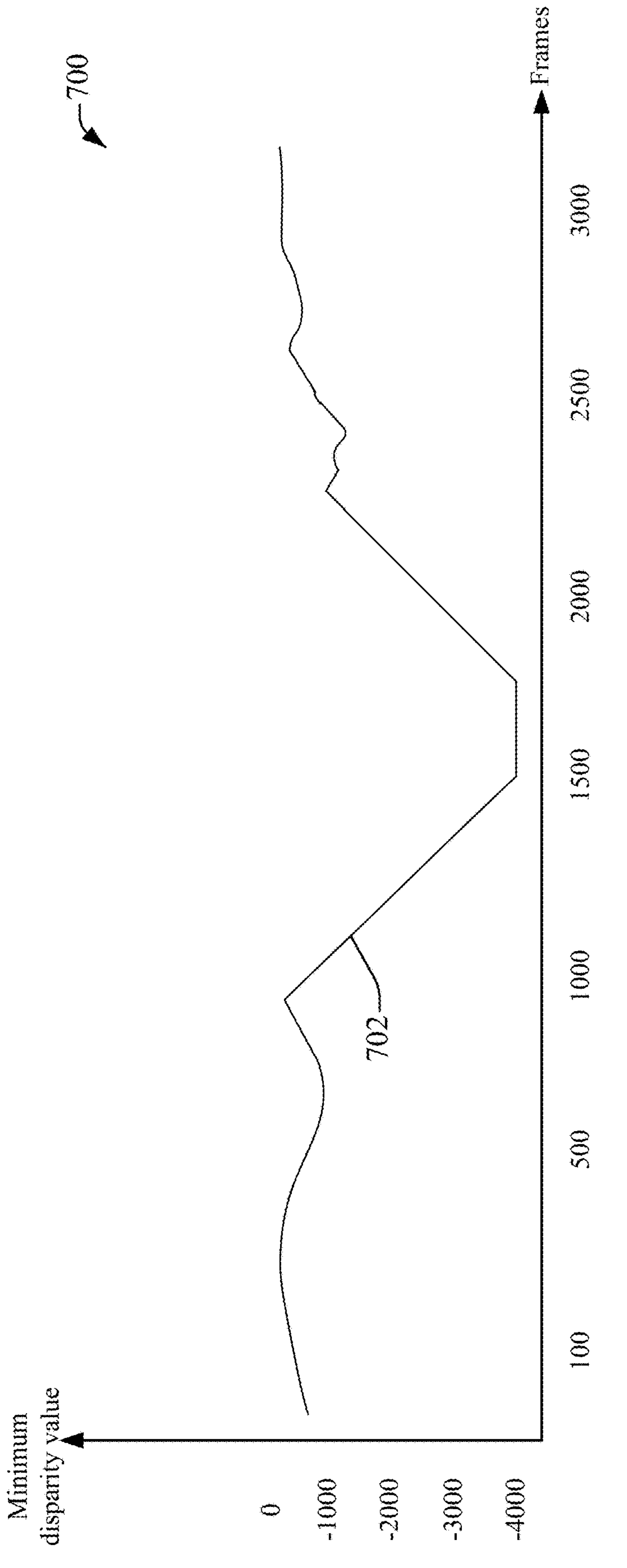
FIG. 7 shows a graph of the adjusted disparity values according to some embodiments.

FIG. 7 shows a graph 700 of the adjusted disparity values according to some embodiments. Parts of the disparity curve 702 have been adjusted as described in FIG. 6 and parts of the curve that were not adjusted are the original disparity values from FIG. 5.

CONCLUSION

Accordingly, rendering information generator 108 adjusts disparity values such that issues that may have occurred when displaying captions are avoided. The adjustment improves the display of captions in the stereoscopic video when using the adjusted disparity values.

System

Figure 8:
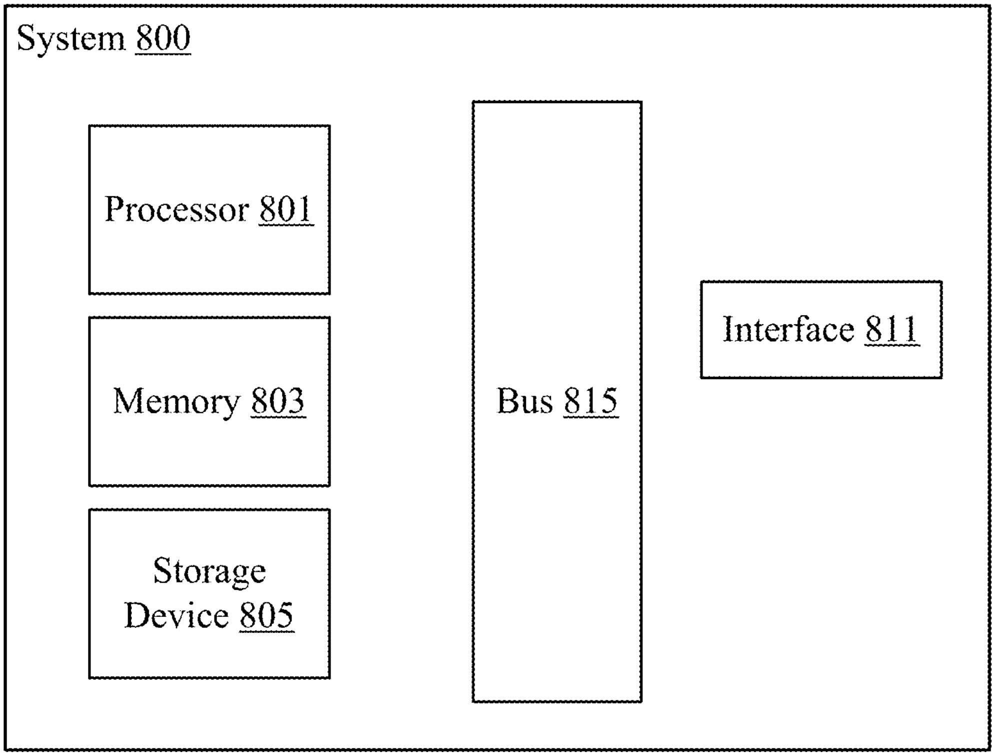
FIG. 8 illustrates one example of a computing device according to some embodiments.

FIG. 8 illustrates one example of a computing device according to some embodiments. According to various embodiments, a system 800 suitable for implementing embodiments described herein includes a processor 801, a memory 803, a storage device 805, an interface 811, and a bus 815 (e.g., a PCI bus or other interconnection fabric.) System 800 may operate as any device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. Memory 803 may be random access memory (RAM) or other dynamic storage devices. Storage device 805 may include a non-transitory computer-readable storage medium holding information, instructions, or some combination thereof, for example instructions that when executed by the processor 801, cause processor 801 to be configured or operable to perform one or more operations of a method as described herein. Bus 815 or other communication components may support communication of information within system 800. The interface 811 may be connected to bus 815 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a" "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

determining a disparity value from a plurality of disparity values in a current frame of a stereoscopic video, wherein the disparity value is based on a difference of a value for a pixel between a first video and a second video of the stereoscopic video;

determining a location in a current frame that includes the disparity value;

analyzing one or more first frames prior to the current frame to adjust disparity values in the one or more first frames to generate one or more adjusted first disparity values, wherein analyzing one or more first frames prior to the current frame comprises:

determining a first frame;

determining whether a disparity value for the first frame is less than a disparity value for the current frame, wherein less than indicates closer to a viewer of the stereoscopic video;

when the disparity value for the first frame is not less than the disparity value for the current frame, determining whether the disparity value for the first frame is greater than the disparity value for the current frame and a difference value, wherein greater than indicates farther away from the viewer of the stereoscopic video;

adjusting the disparity value for the first frame to an adjusted first disparity value that is equal to or less than the disparity value and the difference value;

determining another first frame that is previous to the first frame that was determined; and analyzing a disparity value of the another first frame and the adjusted first disparity value of the first frame to determine whether to adjust the disparity value of the another first frame to generate an adjusted first disparity value for the another first frame;

analyzing one or more second frames after the current frame to adjust disparity values in the one or more second frames to generate one or more adjusted second disparity values; and outputting the one or more adjusted first disparity values and the one or more adjusted second disparity values for use in displaying captions in the first video or the second video.

2. The method of claim 1, wherein:

the one or more adjusted first disparity values do not change more than a difference value in consecutive first frames, and the one or more adjusted second disparity values do not change more than the difference value in consecutive second frames.

3. The method of claim 1, wherein determining the disparity value comprises:

determining a disparity value from the plurality of disparity values that is considered closest to a viewer of the stereoscopic video.

4. The method of claim 1, wherein determining the disparity value comprises:

determining a disparity value for locations in a plurality of locations that is considered closest to a viewer of the stereoscopic video; and determining the location from the plurality of locations.

5. The method of claim 1, wherein the location comprises a cell that is defined as an area in the current frame, wherein the area is used to display a caption in the first video or the second video.

6. The method of claim 1, wherein determining the location comprises:

determining one or more frames that contain the disparity value; and for each of the one or more frames, determining one or more locations that include the disparity value.

7. The method of claim 6, wherein:

for each of the one or more locations:

analyzing one or more first frames prior to a respective frame for a location to adjust disparity values in the one or more first frames to generate one or more adjusted first disparity values; and analyzing one or more second frames after the respective frame for the location to adjust disparity values in the one or more second frames to generate one or more adjusted second disparity values.

8. The method of claim 1, wherein analyzing one or more first frames prior to the current frame comprises:

when the disparity value for the first frame is less than the disparity value for the current frame, ending the analyzing of the one or more first frames prior to the current frame.

9. The method of claim 1, wherein analyzing one or more second frames after to the current frame comprises:

determining a second frame;

determining whether a disparity value for the second frame is less than a disparity value for the current frame, wherein less than indicates closer to a viewer of the stereoscopic video; and when the disparity value for the second frame is not less than the disparity value for the current frame, determining whether the disparity value for the second frame is greater than the disparity value for the current frame and a difference value, wherein greater than indicates farther away from the viewer of the stereoscopic video.

10. The method of claim 1, wherein analyzing one or more second frames after the current frame comprises:

adjusting the disparity value for the second frame to an adjusted second disparity value that is equal to or less than the disparity value and the difference value.

11. The method of claim 1, wherein analyzing one or more second frames after to the current frame comprises:

determining another second frame that is previous to the second frame that was determined; and analyzing a disparity value of the another second frame and the adjusted second disparity value of the second frame to determine whether to adjust the disparity value of the another second frame to generate an adjusted second disparity value for the another second frame.

12. The method of claim 1, wherein analyzing one or more second frames after to the current frame comprises:

when the disparity value for the second frame is less than the disparity value for the current frame, ending the analyzing of the one or more second frames prior to the current frame.

13. The method of claim 1, wherein:

the one or more adjusted first disparity values change at a rate that is equal to or less than a difference threshold, and the one or more adjusted second disparity values change at the rate that is equal to or less than the difference threshold.

14. The method of claim 1, wherein:

the disparity values for one or more first frames prior to the current frame are iteratively adjusted to generate the one or more adjusted first disparity values, and the disparity values for one or more second frames after the current frame are iteratively adjusted to generate the one or more adjusted second disparity values.

15. The method of claim 1, further comprising:

displaying captions using the one or more adjusted first disparity values and the one or more adjusted second disparity values in the first video or the second video.

16. A non-transitory computer-readable storage medium having stored thereon computer executable instructions, which when executed by a computing device, cause the computing device to be operable for:

determining a disparity value from a plurality of disparity values in a current frame of a stereoscopic video, wherein the disparity value is based on a difference of a value for a pixel between a first video and a second video of the stereoscopic video;

determining a location in a current frame that includes the disparity value;

analyzing one or more first frames prior to the current frame to adjust disparity values in the one or more first frames to generate one or more adjusted first disparity values, wherein analyzing one or more first frames prior to the current frame comprises:

determining a first frame;

determining whether a disparity value for the first frame is less than a disparity value for the current frame, wherein less than indicates closer to a viewer of the stereoscopic video;

when the disparity value for the first frame is not less than the disparity value for the current frame, determining whether the disparity value for the first frame is greater than the disparity value for the current frame and a difference value, wherein greater than indicates farther away from the viewer of the stereoscopic video;

adjusting the disparity value for the first frame to an adjusted first disparity value that is equal to or less than the disparity value and the difference value;

determining another first frame that is previous to the first frame that was determined; and analyzing a disparity value of the another first frame and the adjusted first disparity value of the first frame to determine whether to adjust the disparity value of the another first frame to generate an adjusted first disparity value for the another first frame;

analyzing one or more second frames after the current frame to adjust disparity values in the one or more second frames to generate one or more adjusted second disparity values; and outputting the one or more adjusted first disparity values and the one or more adjusted second disparity values for use in displaying captions in the first video or the second video.

17. An apparatus comprising:

one or more computer processors; and a computer-readable storage medium comprising instructions for controlling the one or more computer processors to be operable for:

determining a disparity value from a plurality of disparity values in a current frame of a stereoscopic video, wherein the disparity value is based on a difference of a value for a pixel between a first video and a second video of the stereoscopic video;

determining a location in a current frame that includes the disparity value;

analyzing one or more first frames prior to the current frame to adjust disparity values in the one or more first frames to generate one or more adjusted first disparity values, wherein analyzing one or more first frames prior to the current frame comprises:

determining a first frame;

determining whether a disparity value for the first frame is less than a disparity value for the current frame, wherein less than indicates closer to a viewer of the stereoscopic video;

when the disparity value for the first frame is not less than the disparity value for the current frame, determining whether the disparity value for the first frame is greater than the disparity value for the current frame and a difference value, wherein greater than indicates farther away from the viewer of the stereoscopic video;

adjusting the disparity value for the first frame to an adjusted first disparity value that is equal to or less than the disparity value and the difference value;

determining another first frame that is previous to the first frame that was determined; and analyzing a disparity value of the another first frame and the adjusted first disparity value of the first frame to determine whether to adjust the disparity value of the another first frame to generate an adjusted first disparity value for the another first frame;

analyzing one or more second frames after the current frame to adjust disparity values in the one or more second frames to generate one or more adjusted second disparity values; and outputting the one or more adjusted first disparity values and the one or more adjusted second disparity values for use in displaying captions in the first video or the second video.

18. The non-transitory computer-readable storage medium of claim 16, wherein:

the one or more adjusted first disparity values do not change more than a difference value in consecutive first frames, and the one or more adjusted second disparity values do not change more than the difference value in consecutive second frames.

19. The non-transitory computer-readable storage medium of claim 16, wherein determining the disparity value comprises:

determining a disparity value from the plurality of disparity values that is considered closest to a viewer of the stereoscopic video.

20. The non-transitory computer-readable storage medium of claim 16, wherein determining the disparity value comprises:

determining a disparity value for locations in a plurality of locations that is considered closest to a viewer of the stereoscopic video; and determining the location from the plurality of locations.

* * * * *